INVENTOR.
EDWIN M. SELZLER

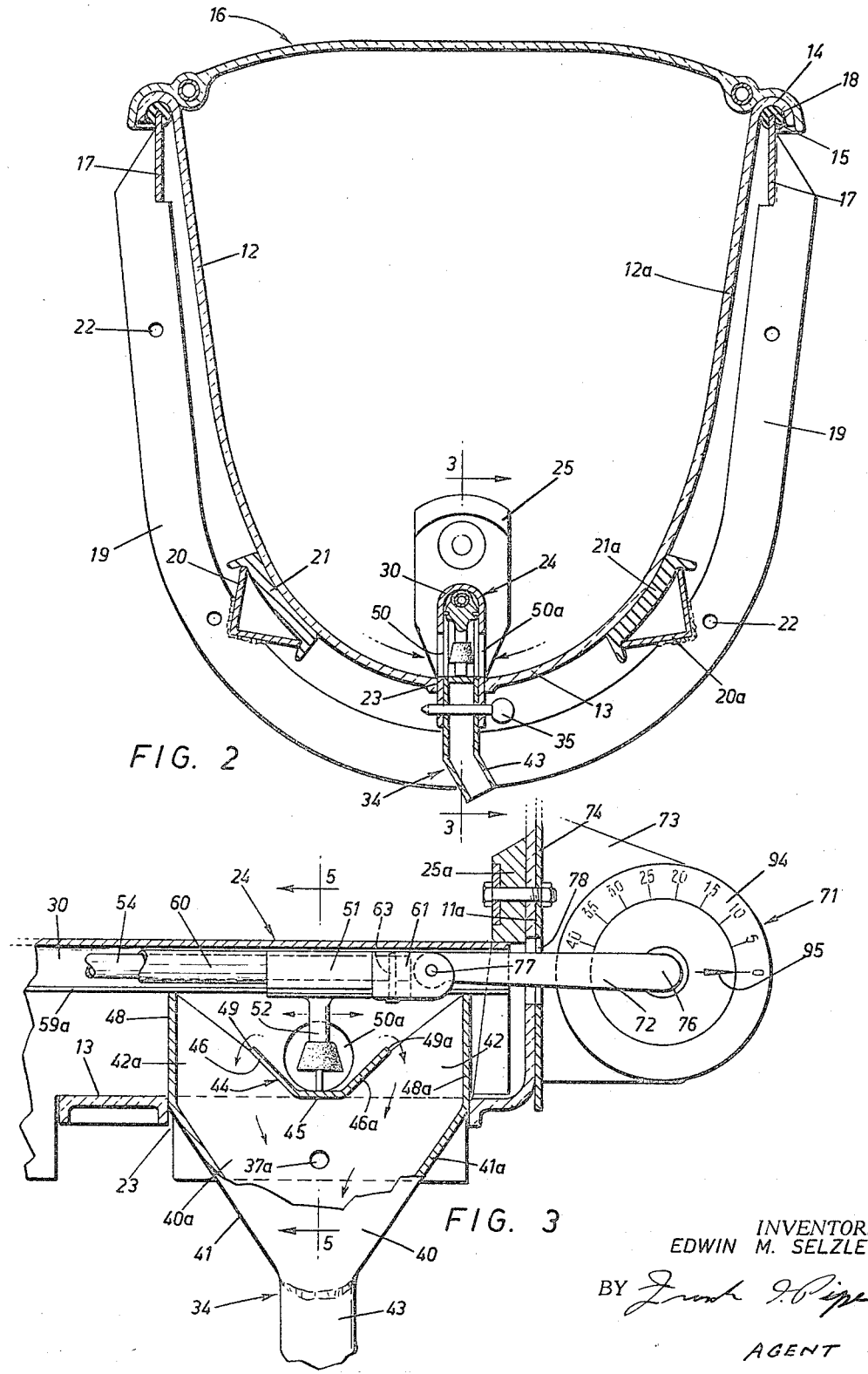

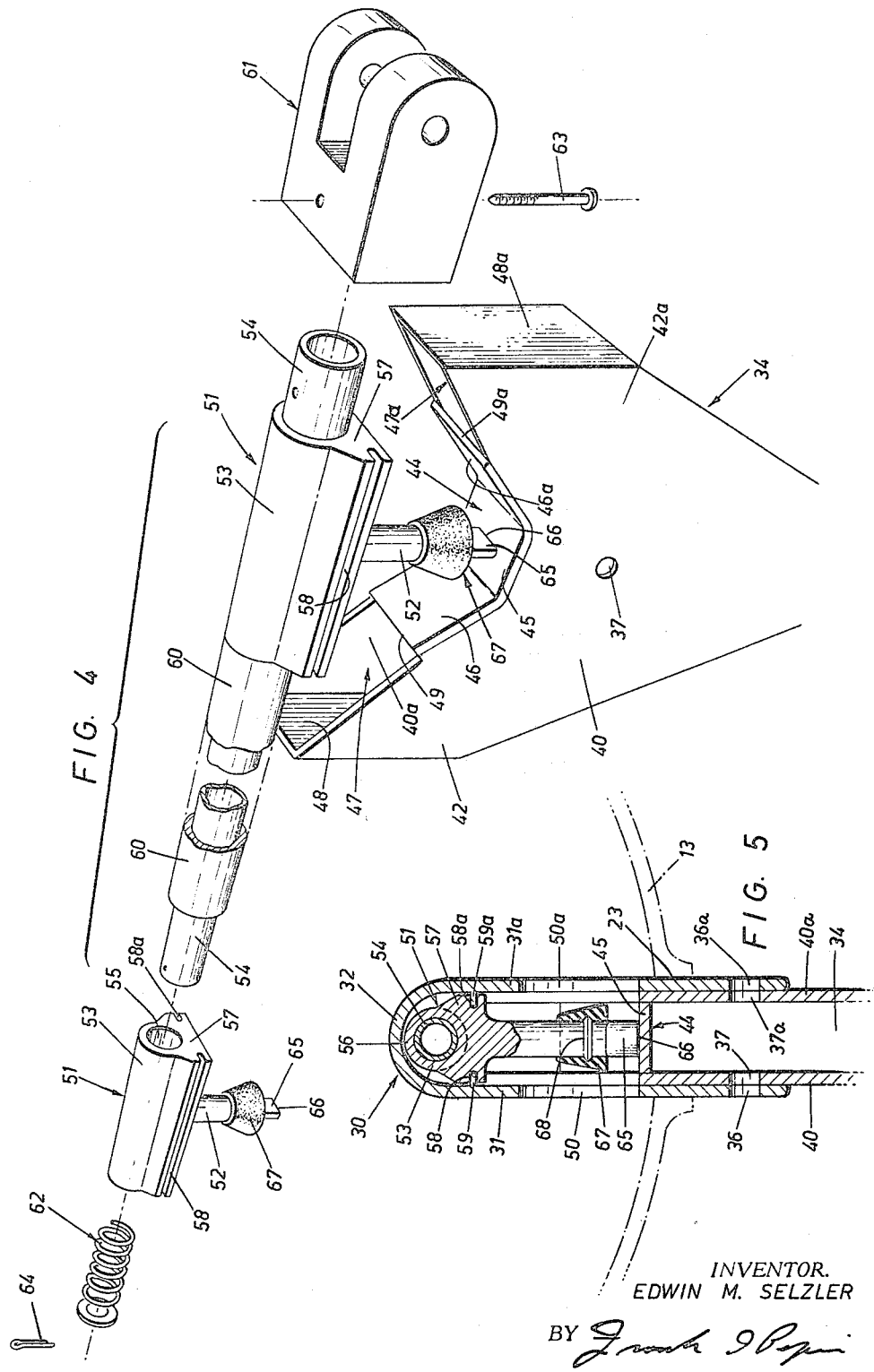

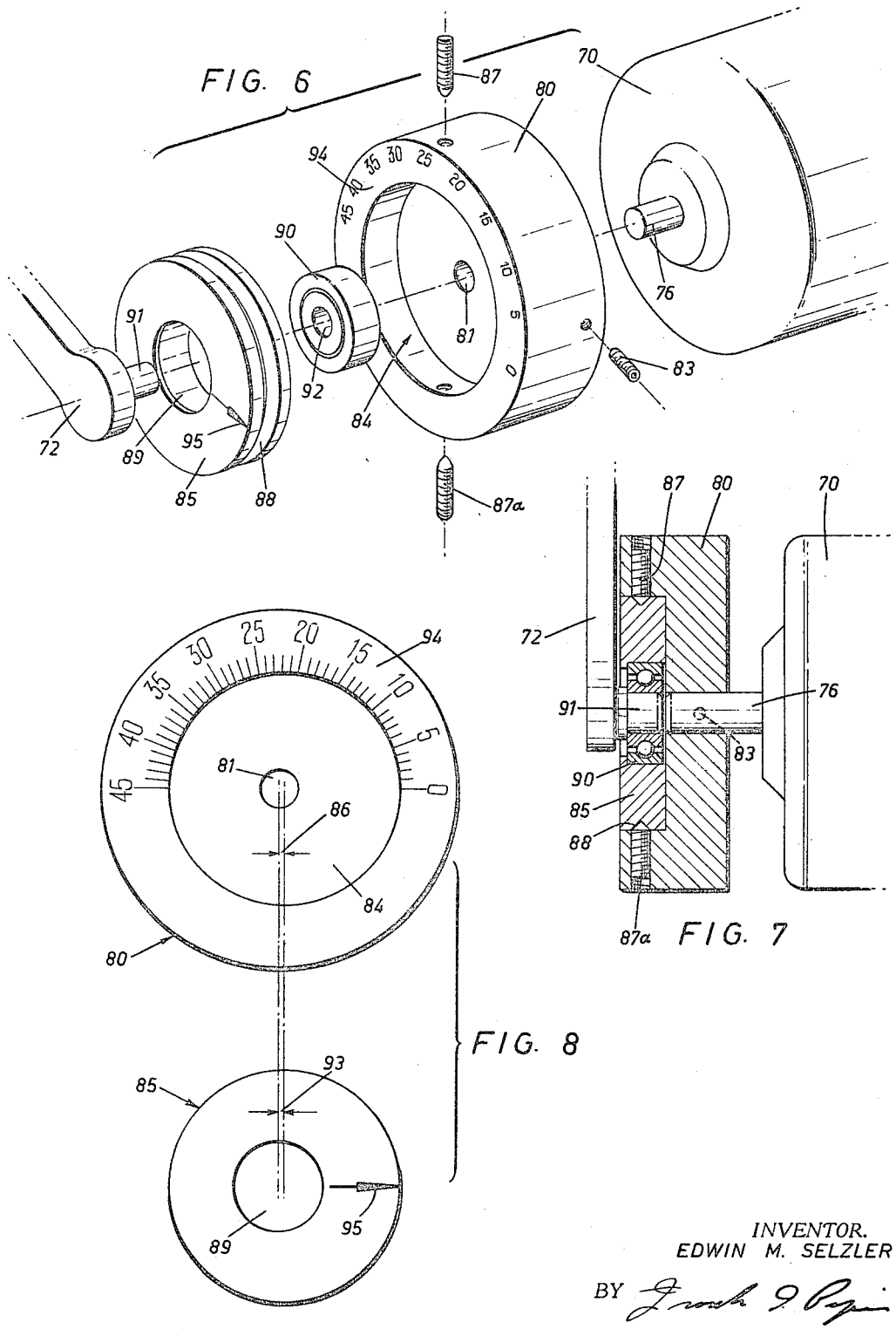

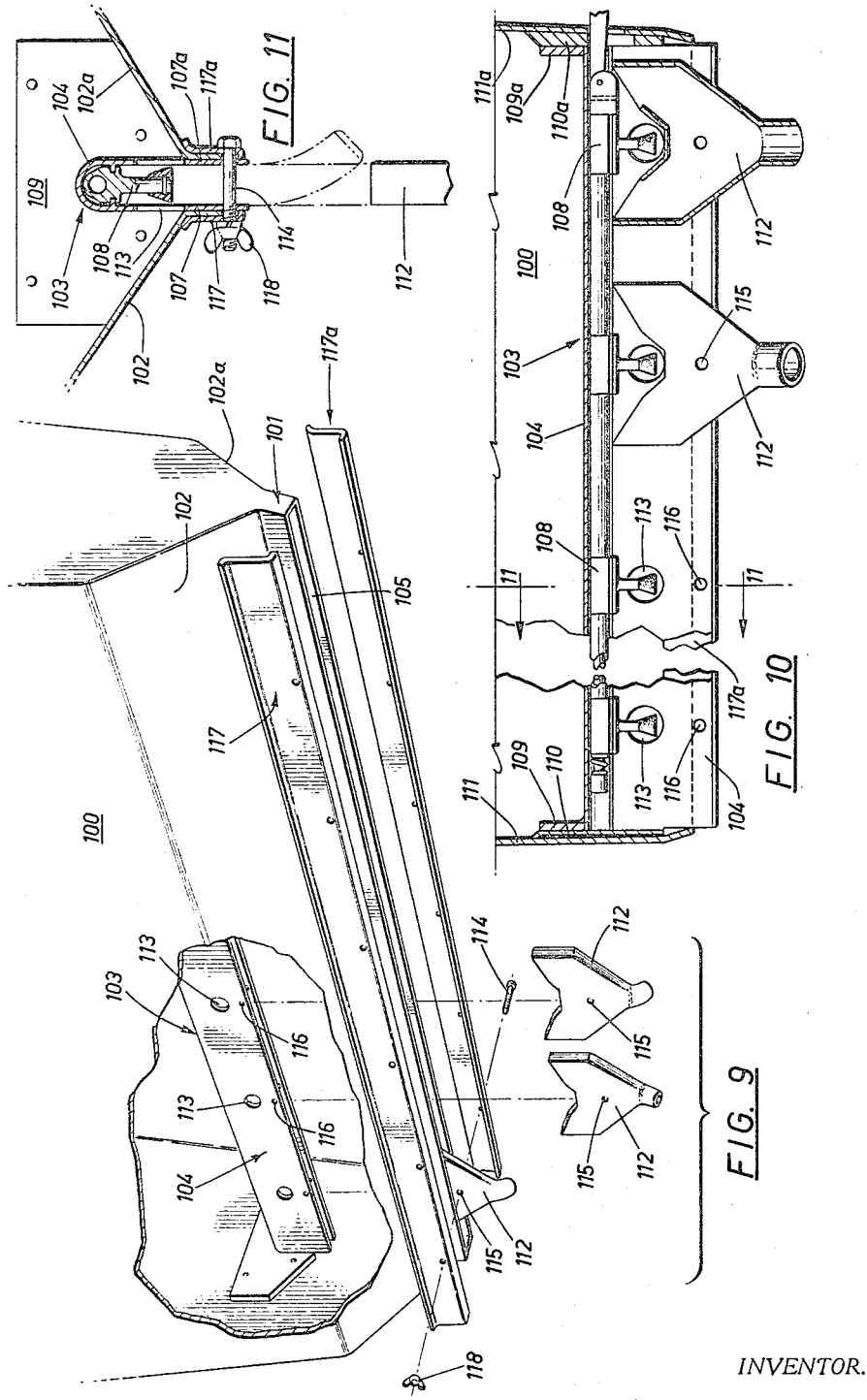

United States Patent Office 3,381,862
Patented May 7, 1968

3,381,862
FERTILIZER DISTRIBUTING DEVICE
Edwin M. Selzler, 3410 31st St. SW.,
Calgary, Alberta, Canada
Continuation-in-part of application Ser. No. 435,523,
Feb. 26, 1965. This application Feb. 15, 1967, Ser.
No. 628,196
14 Claims. (Cl. 222—276)

ABSTRACT OF THE DISCLOSURE

A granular fertilizer distributing apparatus having a storage hopper and metering mechanism powered independently of the implement to which the apparatus is attached. A plurality of metering units in the hopper base operate with a high speed, short stroked reciprocatory motion to displace fertilizer from the hopper into downwardly depending delivery spouts. Rate of delivery is controlled by control of stroke length.

Cross-references to related applications

This application is a continuation-in-part of application Ser. No. 435,523 (now abandoned) filed Feb. 26, 1965.

Background of the invention

This invention relates to an apparatus for distributing granular fertilizers and/or similar materials over the ground. It is particularly directed to an improved granular fertilizer metering device adapted for attachment to conventional agricultural implements such as seeders and which will deliver a controlled amount of fertilizer to the soil under a wide range of operating conditions.

Many devices have been proposed and are in use for distributing granular chemical fertilizer. These devices are generally designed to distribute the fertilizer over the soil or to apply it to the soil in a predetermined amount either concurrently with or separately from the seeds with which the fertilizer is to be used. Generally, fertilizer distributors of this type include an elongated, horizontally positioned storage hopper or bin either carried by an axle on which are mounted the ground wheels by which the device travels or supported by being fastened by suitable means to a grain drill or similar farm implement. The hopper usually is slope-sided and has openings along the base portion through which the fertilizer is distributed to the soil. Various means are known for effecting and controlling the flow of fertilizer from the bin through the outlets. Generally, such means consist of rotary or reciprocatory mechanisms powered by suitable chain, belt or gear drive off the axle on which the ground wheels are mounted. Devices such as these in which the power source for the metering or feed mechanism is dependent on the implement to which the device is attached have a number of disadvantages. Such devices are generally excessively heavy, relatively expensive and do not always provide adequate control over fertilizer distribution rate under rough field conditions. Another disadvantage is that it is difficult to power more than one such fertilizer distributor independently on the same implement.

Summary of the invention

A principal object of the present invention, therefore, is to provide a novel fertilizer distributor which is powered independently of the implement to which it is attached. Another object of this invention is to provide a novel metering device and drive system for implement mounted fertilizer distributors. A further object of this invention is the provision of a fertilizer metering device having novel feed means for positively feeding granular material to the soil at a controlled rate regardless of field conditions. Another object of the invention is the provision of a fertilizer metering device which is easily adjustable for close control of the quantity of fertilizer delivered. Another object of the invention is to provide a metering device which is simple and inexpensive to construct, to operate and to maintain and is easy to clean after use. A still further object of the invention is to provide a novel, lightweight fertilizer storage and distributor unit which can readily be mounted singly or together with any convenient number of identical units on conventional farm implements such as grain drills and the like.

Briefly, these and other objects of the present invention are accomplished by providing a fertilizer storage hopper in combination with a novel metering device which is powered independently of the implement to which it is attached. The device utilizes a plurality of metering units which operate with a high speed, short stroked reciprocatory motion to displace fertilizer from the hopper to downwardly depending delivery spouts communicating with the ground. Delivery rate is controlled by control of stroke length. The device is so arranged and constructed that relatively little power is required for its operation and it can be driven by a small, high speed electric motor powered from the electrical system of a conventional farm tractor.

Description of drawings

A preferred embodiment of the invention is described in detail hereinafter, reference being made to the accompanying drawings in which:

FIGURE 2 is a section taken on line 2—2 of FIGURE 1 showing the construction of the hopper and the positioning of the metering assembly therein;

FIGURE 3 is an enlarged sectional view taken on the line 3—3 of FIGURE 2 showing the relationship of the drive motor, hopper and a metering unit;

FIGURE 4 is an exploded perspective view showing details of the drive rod and metering units;

FIGURE 5 is a sectional view taken on the line 5—5 of FIGURE 3 showing the positioning of the drive rod and meter blocks in the support channel;

FIGURE 6 is an exploded perspective view of the cam assembly;

FIGURE 7 is a top view, in section, of the cam assembly showing the relationship of the assembled parts;

FIGURE 8 is a front view of the cam wheel and the cam disc showing the cam disc recess offset and the bearing bore offset corresponding to the cam disc recess;

FIGURE 9 is an exploded perspective view, partly broken away, showing a modification of hopper base and the metering assembly securing means;

FIGURE 10 is a side elevation in section of the embodiment of FIGURE 9 showing details of the metering assembly securing means; and FIGURE 11 is a sectional view taken along the line 11—11 in FIGURE 10.

Description of the preferred embodiments

Figure 1:
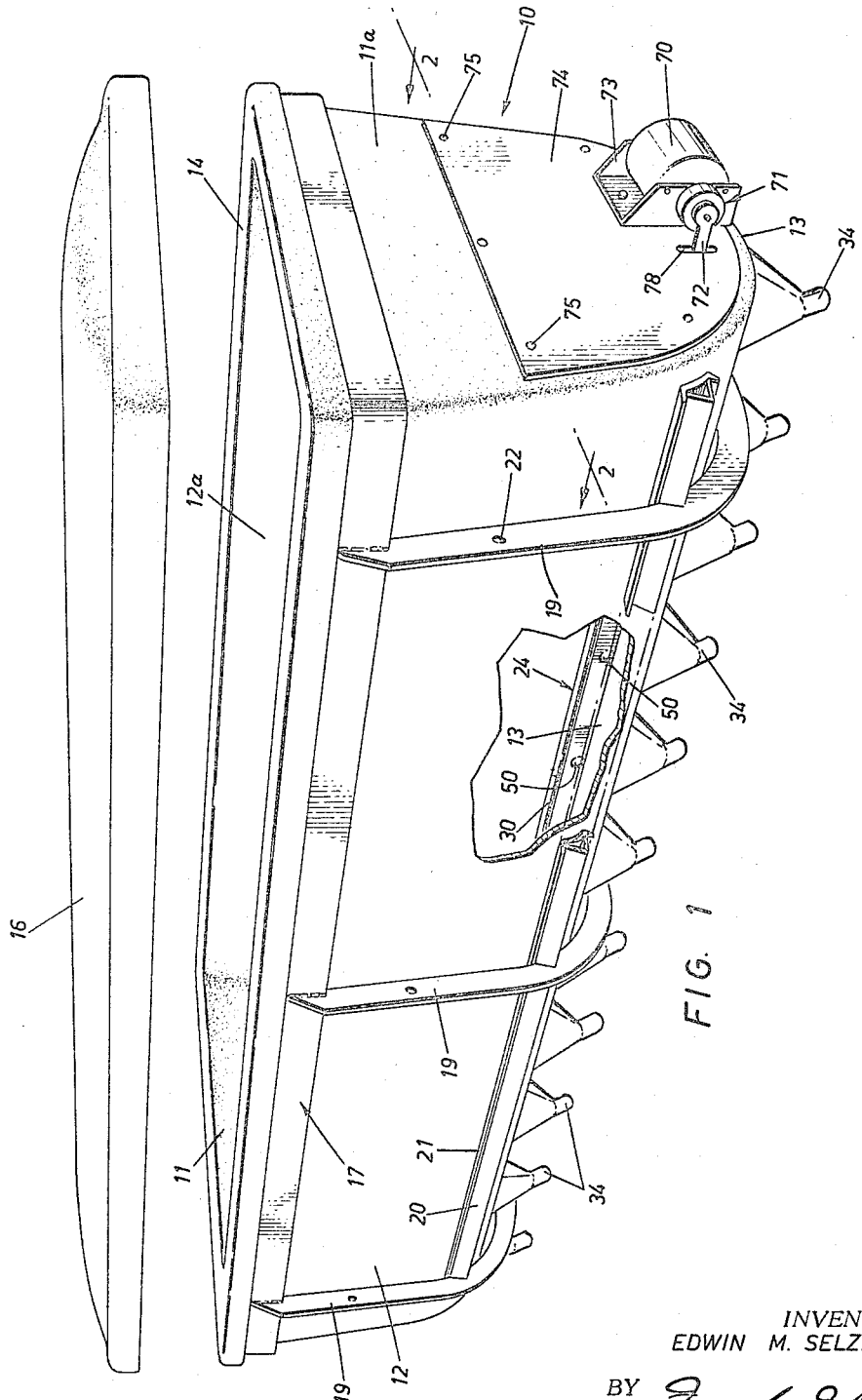
FIGURE 1 is a perspective view, partly in section, of a fertilizer distributor embodying the features of this invention.

In the embodiment shown in FIGURES 1-8 of the drawings, the fertilizer distributor is comprised of trough-shaped hopper indicated generally by 10 having end wall members 11, 11a and inwardly sloping side wall members 12, 12a which meet to form a generally rounded base portion 13. The top edge 14 of the hopper 10 is curled outward and slightly downwardly to form a support groove 15 around the periphery of hopper 10. A suitably hinged lid 16 configured to fit snugly over top edge 14 provides a moisture-proof closure for hopper 10.

Hopper 10 is supported by a rectangular frame 17 which has a rounded buffer member 18 of rubber or the like resilient material fixed thereto and adapted to seat snugly in the support groove 15 formed around the periphery of hopper 10. Frame 17 is fixed to U-shaped brackets 19. Brackets 19 have longitudinal support members 20, 20a fixed thereto near the lower part thereof. Lower buffer members 21, 21a of rubber or the like resilient material are fixed to the upper edge of support members 20, 20a, or, alternatively, can be attached to the hopper walls 12, 12a along the line of contact between the support members 20, 20a, and walls 12, 12a. Frame 17, U-brackets 19 and support members 20, 20a are joined together to form a rigid unitary structure which provides support for the hopper 10 without the necessity of direct connection between the hopper and the unitary support structure. This cradle arrangement is particularly suitable for hoppers formed of fiberglass or the like relatively light, high-strength plastic material since if support members were bolted or otherwise fastened directly to the hopper, high stress would occur at the points of attachment tending to cause failure of the plastic at these points.

U-brackets 19 are provided with means such as bolt holes 22 which can be utilized to attach the device, by any suitable means, not shown, to the farm implement with which it is to be employed.

Hopper 10 is provided with a series of rectangular openings 23 along its base portion 13. The metering assembly, indicated generally by the numeral 24, is fixed on to hopper base 13 by means of channel locks 25, 25a and is adapted to deliver fertilizer or the like granular material through openings 23 at a controlled, uniform rate. The metering assembly 24 comprises an elongated, inverted U-channel 30 having side walls 31, 31a joined by a semi-circular upper portion 32. A plurality of Y-shaped delivery spouts 34 are positioned within channel 30 and depend downwardly therefrom through openings 23. Each delivery spout 34 has side walls 40, 40a, end walls 41, 41a and is formed with arm portions 42, 42a which merge to form open ended, canted leg member 43. Delivery spouts 34 are held in position within channel 30 by transverse pins 35 passing through openings 36, 36a formed in side walls 31, 31a of channel 30 and openings 37, 37a formed in side walls 40, 40a of spout 34. Arms 42, 42a are open at the top except for a central bridge 44. Bridge 44 has a flat, central base portion 45 and adjacent wing portions 46, 46a which project upwardly from base 45 at an obtuse angle therefrom. Openings 47, 47a communicating with the openings through leg member 43 are defined between the upper end walls 48, 48a of arms 42, 42a, side walls 40, 40a and the upper edges 49, 49a of bridge wings 46, 46a.

Channel 30 has a series of oppositely positioned openings 50, 50a formed in side walls 31, 31a at about the vertical centre line of each delivery spout 34. Openings 50, 50a are circular-shaped with the lowest point on their circumferences level with base 45 of bridge 44 and have a diameter about equal to or slightly greater than the length of bridge wings 46, 46a. A metering block 51 is positioned within channel 30 above each delivery spout bridge 44. The blocks 51 are mounted on drive rod tube 54 which extends the length of channel 30. Each meter block 51 is comprised of a stem portion 52 and integral sleeve 53. The opening 55 through sleeve 53 is adapted to slidably receive rod 54. Sleeve 53 is formed with a rounded top portion 56 having about the same radius as semi-circular portion 32 of channel 30, and a generally rectangular base portion 57 which has a width slightly less than the distance between side walls 31, 31a of channel 30. Grooves 58 and 58a are formed along the length of base portions 57 of sleeve 53. Blocks 51 and rod 54 are retained in position within channel 30 with the rounded portion 56 of sleeve 53 slightly below semi-circular portion 32 of channel 30 by means of guides 59, 59a on channel walls 31, 31a and adapted to fit grooves 58, 58a. The relative sizes of grooves 58, 58a and guides 59, 59a are correlated to permit longitudinal sliding movement but little or no vertical movement of rod 54 and blocks 51. Spacers 60 are slidably mounted on rod 54 between blocks 51 to hold the blocks in proper spaced relationship along rod 54. Blocks 51 and spacers 60 are held against crank pivot block 61, mounted at the front end of rod 54 by means of compressed coil spring 62 positioned around rod 54 at the opposite end thereof from the pivot block 61. Pivot block 61 and spring 62 are held in position on rod 54 by means of threaded pin 63 and cotter key 64 respectively.

In operating position, the stem 52 of each meter block 51 projects downwardly to a point slightly above base 45 of corresponding bridges 44. The stem 52 is generally cylindrical in shape with a flattened, square ended tip 65 having its wide side perpendicular to the long axis of channel 30 and its bottom edge 66 generally parallel to base 45 of bridge 44. A shield 67 having a truncated conical shape with its wide diameter at the bottom is positioned on stem 52 a short distance above tip 65. As shown in FIGURE 5, stem 52 has a circular rib 68 formed thereon for retaining shield 67 in position.

Power means, independent of the implement to which the distributor is to be attached, are provided for effecting rapid, longitudinal reciprocation of drive rod 54 and meter blocks 51 mounted thereon. In the embodiments illustrated, the power means comprises electric motor 70 secured to hopper end wall 11a and adapted to power drive rod 54 through a cam assembly indicated generally by 71, crank 72 and pivot block 61. Motor 70, which is adapted to operate with power provided from the electrical system of a tractor, is secured to hopper end wall 11a by channel bracket 73 which is bolted to plate 74. Plate 74 is secured to end wall 11a by suitable fastening means 75. Preferably, plate 73 is large enough to distribute the load imposed by motor 70 over a substantial portion of the end wall 11a area. Motor 70 is positioned such that the axis of its drive axle 76 is in substantially the same horizontal plane as the axis of drive rod 54.

Crank 72 is pivotally attached to pivot block 61 by means of transverse crank pin 77 and is linked at its opposite end through opening 78 in hopper end wall 11a and plate 74 to cam assembly 71. The cam assembly 71 is arranged and constructed to permit easy adjustment of crank stroke length and to provide visual indication of stroke length setting. Referring particularly to FIGURES 6 through 9, the cam assembly comprises a cam wheel 80 mounted on motor drive axle 76 by means of centrally positioned bore 81 and set screw 83. Cam wheel 80 has a recess 84 formed therein which is adapted to receive cam disc 85. Cam disc recess 84 is horizontally offset in relation to the centre of cam wheel 80 a distance equal to one half the maximum desired crank stroke length as shown at 86 in FIGURE 8. Cam disc 85 is adjustably secured in recess 84 by means of set screws 87, 87a which seat in groove 88 formed around the periphery of cam disc 85. Cam disc 85 has a bore 89 formed therethrough into which is press-fitted crank pin bearing 90. Crank pin 91 of crank 72 is press-fitted into bore 92 in bearing 90. Bore 89 is horizontally offset in relation to the centre of cam disc 85 an amount equal to the offset 86 of cam recess 84 as is shown at 93, FIGURE 9. It will be evident that with the cam disc 85 at the "zero" position, as shown particularly in FIGURES 8 and 9, the offset 86 of recess 84 will be cancelled by the offset 93 of bore 89. The crank pin 91 will then be concentric with the axis of drive axle 76 of motor 70, and the stroke length of crank 72 will be zero. As cam disc 85 is rotated counter-clockwise in recess 84, the eccentricity of crank pin 91 in relation to the centre of cam wheel 80 is increased until at 180° from the "zero" position the maximum eccentricity, equal to four times the offset distance 86 or 93, is obtained. The length of crank 72 and the maximum degree of eccentricity of pin 91 are correlated and adjusted such that the maximum stroke length of crank 72 is about equal to the length of base portion 45 of bridge 44 and the mid-point of the stroke is at about the vertical centre line of spouts 34. The degree of eccentricity, and thus the relative stroke length of crank 72 is shown visually by indicator dial 94 and pointer 95. In the embodiment shown, the spacings and numerals on dial 94 are calibrated to indicate the fertilizer distribution rates for a given implement speed in tens of pounds per acre at the various dial settings.

The operation of the invention is relatively simple. The hopper 10 with metering assembly 25 and drive means in position is attached to an implement such as a seed drill by any suitable attachment means secured to the implement and to U-brackets 19. One or more units can be attached to a single implement depending on the size of the implement and the size of each hopper unit. Once attached, hopper 10 is charged with granular fertilizer, and the motor is connected through suitable leads, not shown, with the electrical system of the tractor employed to tow the implement. Preferably, motor 70 is a constant speed motor adapted to operate at about 2400 to 3000 r.p.m. Thus, reciprocation rate also is constant and normally will be in the range of about 40 to 60 c.p.s. The stroke length of the drive rod 54 is adjusted to provide the desired rate of fertilizer distribution having regard to the speed with which the implement is to be towed. The length of the stroke at a given speed of the implement controls the rate of fertilizer application, e.g. at an implement speed of 5 miles per hour, the stroke can be adjusted to distribute from less than 5 to 450 pounds or more per acre. Maximum delivery rate is obtained with the maximum stroke length, usually up to about ¼ inch for distributors capable of delivering up to about 500 pounds of granular fertilizer per acre. For devices capable of higher distribution rates, the size of all component parts of the metering assembly would be correspondingly increased. In practice, calibration charts are prepared for each distribution unit showing the precise delivery rate for various types of fertilizers at various settings of dial 94. Thus, once the operator determines the per acre fertilizer requirements, the type of fertilizer and the implement speed, the dial setting for the desired delivery rate is obtained from the calibration chart. The dial setting and the distribution rate is varied simply by loosening set screws 87, turning cam disc 85 to the desired setting and tightening set screws 87 again.

The configuration and composition of meter block shield 67 are important. We have found that very precise control over delivery rate can be obtained when shield 67 has the truncated conical shape shown in the drawings and when it is formed of relatively soft rubber having a hardness of about 35–45 on the durometer scale, preferably 40. The precise shape and size of openings 50, 50a are not critical. However, circular openings are the most efficient and it is necessary that the size of the openings be large enough to permit free flow of granular material onto the bridge 44, but not so large as to permit uncontrolled flow over edges 49, 49a of wing portions 46, 46a.

Many of the component parts of the distributor of this invention can conveniently be constructed of lightweight plastic materials. For example, the hopper 10 and lid 16 can be formed of fiberglass, the metering blocks 51, delivery spout bridges 44, and pivot block 61 can be formed of molybdenum disulphide glass fibre filled nylon (ordinary nylon possesses satisfactory wearing qualities but tends to give up moisture content to the fertilizer on contact with same with the result that the nylon becomes brittle and subject to breakage). Drive rod 54 and channel 30 can be formed of aluminum tubing and the spacers 60 of glass fiber filled styrene. The overall result of the use of materials such as these is low manufacturing costs and exceedingly low weight in the complete unit. Commercial size units of convenient lengths, e.g. 5, 6 and 7 feet weigh only 53, 58 and 63 pounds respectively complete with steel mounting frames.

The lightweight and relative simplicity of construction also make cleaning of the device after use easy. The device is cleaned simply by removing pins 35 holding delivery spouts 34 in position, disconnecting the electrical leads, removing hopper lid 16 and dumping any residual fertilizer. The hopper 10 is then uprighted again and any residual fertilizer in channel 30 is easily shaken out through the relatively large openings left by the removal of the spouts 34.

Referring now to FIGURES 9–11, in which another modification of the invention is illustrated, the hopper 100 is formed with an elongated downwardly projecting spout portion 101 which is integral with sloping hopper side walls 102, 102a. An elongated opening 105 formed along the base of spout 101 communicates with the hopper interior.

Metering assembly 103 is positioned within the hopper with the lower edges of metering channel 104 projecting into spout portion 101 as shown at 107, 107a in FIGURE 11. Metering assembly 103 is of the same general construction and operates in the manner as described above with reference to FIGURE 1 through 8, except that the meter block 108 does not include the tip portion indicated at numeral 65 in FIGURES 1 through 8. The metering assembly 103 is secured in position in the hopper by means of a pair of end plates 109, 109a welded to metering assembly channel 104 at the opposite ends thereof and attached by means of bolts or the like (not shown) to end walls 111, 111a of hopper 100. Resilient spacers 110, 110a (see FIGURE 10) are provided between plates 109, 109a and end walls 111, 111a to seal the joints between the metering channel ends and the hopper end walls.

Delivery spouts 112 are positioned in meter assembly channel 104 at openings 113 as described in more detail in the principal disclosure hereinabove. Spouts 112 are secured in position within channel 104 by bolts 114 passing through holes 115 formed through the side walls of the spouts and through corresponding holes 116 formed along the lower edges of channel 104. A pair of elongated strips 117, 117a, formed of aluminum or other suitable material are clamped adjacent spout 101 by means of bolts 114 to provide reinforcing along opening 105 and to further secure the spouts 112 in position. Bolts 114 are preferably secured by wing nuts 118 which facilitate assembly and disassembly of the device. It is contemplated that in place of elongated strips 117, 117a, pairs of short clips having essentially the same cross-section as strips 117, 117a can be clamped between bolts 114 at each spout 112.

The fertilizer distributor of this invention has many important advantages. For example, the device can be used on most conventional farm implements since it is powered independently of the implement itself. Also, because of its lightweight and compact size, one or more units can quickly and easily be attached to such implements with a minimum of ancillary equipment and tools. The device is inexpensive to construct, to maintain and to operate. It provides a wide range of distribution rates which can be closely controlled even on rough and/or hilly terrain.

It will be understood, of course, that modifications can be made in the preferred embodiment of the invention described and illustrated herein without departing from the scope of the invention defined by the appended claims.

What I claim as new and desire to protect by Letters Patent of the United States is:

1. A device for distributing granular material over the ground comprising, in combination: a hopper having a bottom with an opening formed therein; enclosure means positioned with said hopper enclosing said bottom opening; said enclosure means having at least one opening formed therein communicating the interior of the hopper with said bottom opening; means positioned within said enclosure means defining a bridge and a discharge channel adjacent said enclosure means opening; drive means disposed within said enclosure means adapted to reciprocate therein; power means for effecting reciprocal movement of said drive means; a projection depending from said drive means adjacent said enclosure opening and above said bridge such that reciprocal movement of said projection controls the entry of granular material from the hopper through the enclosure means opening onto the bridge and the discharge of said granular material from the bridge through said discharge channel.

2. A device as claimed in claim 1 including means for varying the length of stroke of the drive means whereby the rate of discharge of granular material can be varied.

3. A device as claimed in claim 2 wherein said hopper is elongated and the bottom opening extends substantially the length thereof; said enclosure means has spaced apart side walls with a plurality of pairs of oppositely positioned openings formed along the length thereof; and said bridge and discharge channel defining means comprises downwardly depending spouts positioned between said side walls adjacent each of said pairs of side wall openings.

4. A device as claimed in claim 3 wherein said hopper bottom opening is defined between parallel, downwardly projecting extensions of the hopper bottom and said spouts are retained in position by removable pins passing transversely through said extensions and spouts.

5. A device for distributing granular material comprising, in combination: an elongated, trough-shaped hopper having spaced side walls, end walls and a base, said base having an opening formed longitudinally along its median line; an inverted U-shaped member having spaced-apart side walls disposed along said hopper base such that said side walls project into said base opening, said inverted member walls having oppositely positioned openings formed at spaced intervals along its length; an elongated rod disposed within said inverted member and adapted for axial reciprocal movement therein; meter means mounted on said rod and depending downwardly therefrom opposite each of said inverted member wall openings; delivery spouts at each of said openings projecting downwardly from said hopper base, each of said spouts having spaced side walls and end walls extending above the hopper base, said spout end walls defining a plurality of compartments in the inverted member; a bridge formed transversely of each of said compartments from said one side wall thereof to the other and positioned below said inverted member side wall openings and said downwardly depending meter means; said bridges and meter means so arranged and constructed that granular material flowing inwardly through said side wall openings onto said bridges is positively displaced from said bridges into said delivery spouts by rapid reciprocal movement of said depending meter means.

6. A device for distributing granular material comprising, in combination: an elongated hopper having spaced side walls, end walls and a bottom having a plurality of openings formed longitudinally thereof; enclosure means positoined within said hopper extending along said bottom coextensive with and enclosing said bottom openings; said enclosure means having a plurality of openings formed therein corresponding with said bottom openings; means positioned intermediate each of said bottom openings and corresponding enclosure openings defining bridge and discharge channels therebetween; drive means disposed within said enclosure means adapted to reciprocate longitudinally therein; power means for effecting reciprocal movement of said drive means; said drive means having vertical projections depending downwardly therefrom adjacent each of said enclosure openings and above each of said bridges such that reciprocal movement of said vertical projections controls the entry of granular material from the hopper through the enclosure openings onto the bridges and the discharge of said granular material from the bridges through said discharge channels.

7. A device for distributing granular material comprising, in combination: an elongated, trough-shaped hopper having spaced side walls, end walls and a base, said base having a plurality of equispaced openings formed longitudinally along its median line; an inverted U-shaped member having spaced-apart side walls disposed along said hopper base such that said side walls enclose said base openings, said inverted member walls having oppositely positioned openings formed at spaced intervals corresponding to said base openings; an elongated rod disposed within said inverted member and adapted for axial reciprocal movement therein; meter means mounted on said rod and depending downwardly therefrom over each of said base openings and opposite said inverted member wall openings; delivery spouts at each of said base openings projecting downwardly from said hopper base, each of said spouts having spaced side walls and end walls extending above the hopper base, said spout end walls defining a plurality of compartments in the inverted member; a bridge formed transversely of each of said compartments from one side wall thereof to the other and positioned below said inverted member side wall openings and said downwardly depending meter means; said bridges and meter means so arranged and constructed that granular material flowing inwardly through said side wall openings onto said bridges is positively displaced from said bridges into said delivery spouts by rapid reciprocal movement of said depending meter means.

8. A device as claimed in claim 7 wherein said rod is axially reciprocated by a prime mover positioned in proximity to one end wall of the hopper and operably connected to said rod by a crank and cam assembly.

9. A device as claimed in claim 7 wherein the power means is adjustable to vary the amplitude of meter means reciprocal movement.

10. A device for distributing granular material comprising, in combination: an elongated hopper having spaced side walls, end walls and a generally arcuate bottom having a plurality of equispaced openings formed longitudinally along its median line; an inverted U-shaped channel having spaced apart side walls positioned along said bottom and having side wall projections extending through said bottom openings, said U-shaped channel having a series of oppositely positioned, circular openings formed in the side walls thereof corresponding with said bottom openings; delivery spouts positioned within said U-shaped channel at each of said bottom openings, each of said spouts having spaced side walls, end walls and bridges defining two upwardly extending channels converging to form one downwardly depending channel; an elongated drive member disposed within said U-shaped channel; power means secured to one end wall of said hopper and adapted to impart a short-stroked reciprocal movement to said drive member; a plurality of metering blocks mounted on said drive member, each of said metering blocks having an upper sleeve adapted to slidably receive said drive member and a downwardly depending stem integral with said sleeve, said metering blocks being positioned on said drive member such that said stem portions thereof are opposite said circular openings in said U-shaped channel walls and slightly above the bridge of said spouts whereby reciprocating movement of said meter blocks propels granular material flowing through said circular openings onto said bridges into said upward extending channels of said delivery spouts from whence it falls by gravity to the soil.

11. A device as claimed in claim 10 wherein said power means comprises an electric motor adapted to operate on current supplied from the electrical system of a tractor.

12. A device as claimed in claim 11 wherein said electric motor reciprocates the drive member through a crank and cam assembly which is adjustable to vary the length of the drive member stroke.

13. A device as claimed in claim 10 wherein a shield having the configuration of a truncated cone and formed of rubber is secured to the stem of said metering block.

14. The device of claim 13 wherein said shield is formed of rubber having a hardness of about 35 to 45 on the durometer scale.

References Cited

UNITED STATES PATENTS

| 173,380 | 2/1876 | Wight et al. | 222—409 X |
| 2,748,986 | 6/1956 | Steel | 222—409 X |

FOREIGN PATENTS

| 107,988 | 7/1939 | Australia. |
| 878,334 | 9/1961 | Great Britain. |

ROBERT B. REEVES, *Primary Examiner.*

FREDERICK R. HANDREN, *Examiner.*